United States Patent [19]

Cloeren

[11] Patent Number: 4,619,802
[45] Date of Patent: Oct. 28, 1986

[54] DIE WITH COMBINING ADAPTOR INSERT AND MELT-LAMINATION PROCESS

[76] Inventor: Peter Cloeren, 2206 N. 16th St., Orange, Tex. 77630

[21] Appl. No.: 612,307

[22] Filed: May 21, 1984

[51] Int. Cl.⁴ .................... B28B 3/20; B29C 47/00
[52] U.S. Cl. .................... 264/171; 425/131.1; 425/133.5; 425/376 A; 425/462; 425/467
[58] Field of Search .................. 425/131.1, 133.5, 462, 425/467, 376 A, 461; 264/171, 177 R, 176 R

[56] References Cited

U.S. PATENT DOCUMENTS

| 3,223,761 | 12/1965 | Raley | 264/514 |
|---|---|---|---|
| 3,397,428 | 8/1968 | Donald | 264/171 |
| 3,587,281 | 6/1971 | Lemelson | 425/465 |
| 3,761,211 | 9/1973 | Parkinson | 425/131 |
| 4,152,387 | 5/1979 | Cloeren | 425/133.5 |
| 4,171,195 | 10/1979 | Klein et al. | 425/467 |
| 4,189,292 | 2/1980 | Hureau et al. | 425/467 |
| 4,197,069 | 4/1980 | Cloeren | 425/133.5 |
| 4,240,782 | 12/1980 | McPhee et al. | 425/467 |
| 4,285,655 | 8/1981 | Matsubara | 425/461 |
| 4,422,839 | 12/1983 | Przytulla et al. | 425/467 |

FOREIGN PATENT DOCUMENTS

| 209529 | 12/1983 | Japan | 425/461 |
|---|---|---|---|
| 397357 | 1/1974 | U.S.S.R. | 425/461 |

OTHER PUBLICATIONS

"On the Interface Deformation in the Stratified Two-Phase Flow of Viscoelastic Fluids", Khan and Han, Dept of ChE, Polytech Institute of New York, 1976, The Society of Rheology, Inc. pp. 595–621.

Primary Examiner—Jay H. Woo
Assistant Examiner—Timothy W. Heitbrink
Attorney, Agent, or Firm—Timothy R. Kroboth

[57] ABSTRACT

An extrusion apparatus including a die and a combining adaptor is provided. The combining adaptor is inserted in a cavity in the die. The extrusion apparatus includes flow channels, which converge in the proximity of a locus at which a layered melt stream formed by the convergence, is caused to diverge and flow transversely. The locus of divergence is within a manifold. As a result, the apparatus makes a laminate having layers of substantially uniform thickness without profiling of the layered melt stream. Also provided is a process for making the laminate without profiling. The invention lessens the curtaining effect in the layers of the laminate formed.

5 Claims, 2 Drawing Figures

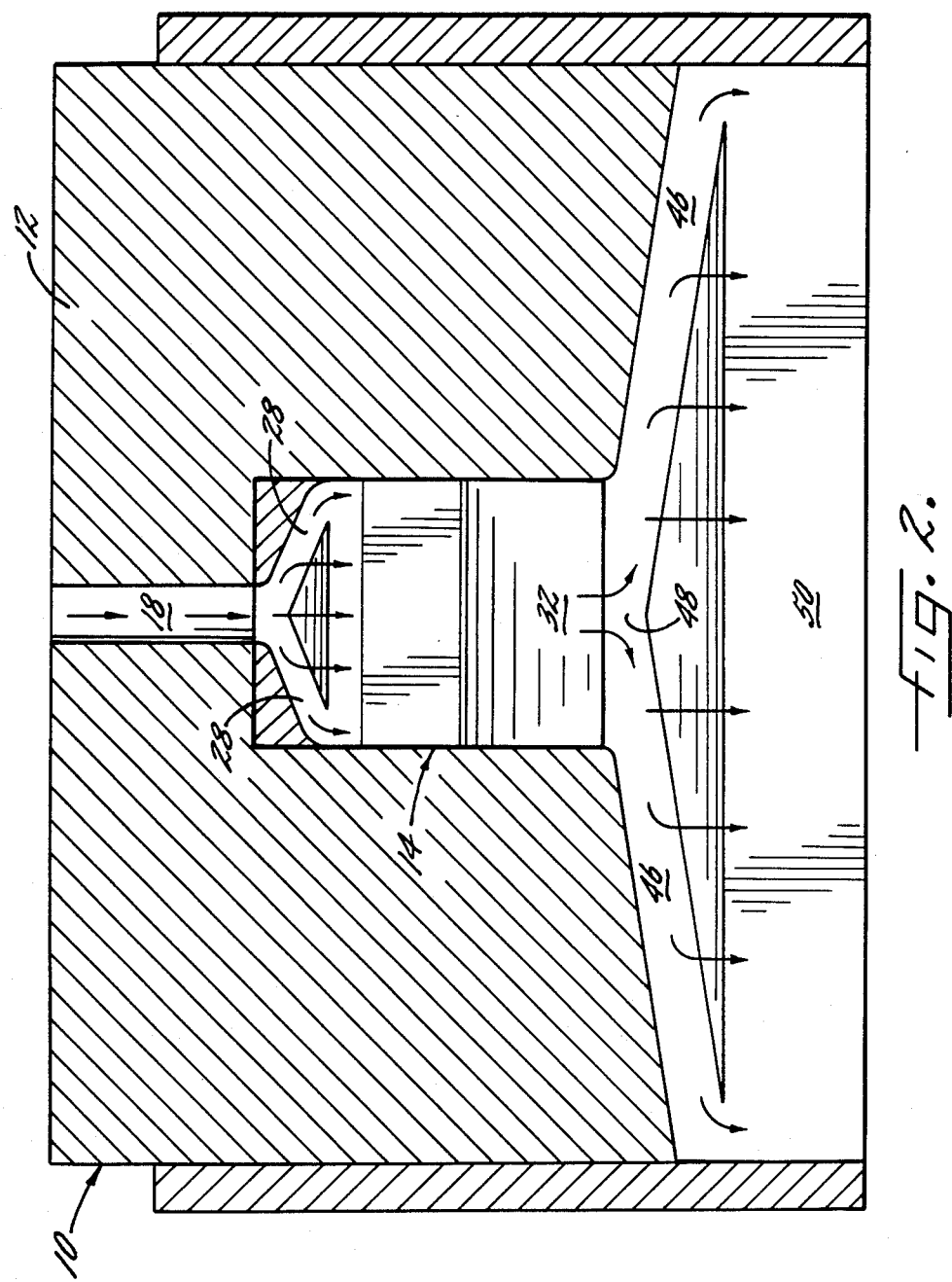

DIE WITH COMBINING ADAPTOR INSERT AND MELT-LAMINATION PROCESS

TECHNICAL FIELD

The present invention relates to the melt-lamination of thermoplastic materials. More specifically, this invention primarily relates to forming a laminate from resins of dissimilar flow properties using a combining adaptor in combination with a die.

BACKGROUND ART

One approach to the melt-lamination of thermoplastic materials is to use an extrusion apparatus including a combining adaptor, a die and a connecting duct, which in cross-section is typically rectangular in shape. In the adaptor, flow channels converge as a result of which there is a confluence of the molten resin streams that flow through the flow channels, to form a melt-laminate. The layered melt stream exits from the combining adaptor, passes through the connecting duct and flows into the die, which is typically a single manifold die. In the die manifold, the melt-laminate diverges at a locus of divergence and transverse flow takes place over the length of the manifold. Hence, the layered melt stream leaving the manifold is wider than the stream entering the manifold. This wider melt-laminate flows through an exit channel and exits from the die.

A problem with this type of apparatus is that a laminate formed from thermoplastic materials of dissimilar flow properties will have layers of non-uniform thickness. A. A. Khan and C. D. Han, *Transactions of the Society of Rheology*, vol. 20(4), pp. 595–621 (1976) is illustrative of investigative studies relating to this problem. FIG. 7 of this publication shows that the layers of a melt-laminate become increasingly non-uniform as the melt-laminate progressively flows through a rectangular duct. Furthermore, passing the layered melt stream through a die manifold additionally promotes layer non-uniformity.

A further problem with this type of apparatus is that each layer of the laminate formed thereby exhibits the curtaining effect. The curtaining effect is a well known defect in the layers of a thermoplastic laminate. It is characterized by a pattern in the individual layers that is particularly apparent when the layers are pigmented.

An extrusion apparatus is known in which the combining adaptor is connected directly to a die. This type of apparatus, which is exemplified by U.S. Pat. No. 3,761,211 to Parkinson, advantageously lacks the connecting duct. However, it does not provide a solution to either of these problems.

Also known in the prior art, as illustrated by my U.S. Pat. Nos. 4,152,387 and 4,197,069, is a combining adaptor having an adjustable divider provided between any two of the flow channels thereof. Each flow channel includes a back pressure cavity and a flow restriction channel located between the back pressure cavity and the point of convergence of the flow channels. This combining adaptor provides for adjustment of flow restriction channel width by manipulation of the adjustable divider. The layers of a laminate made by use of this adaptor in combination with a conventional single manifold die, exhibit the curtaining effect.

One solution to the problem of layer non-uniformity has been to profile the melt-laminate, that is, to transform the cross-sectional configuration of each stream of the melt-laminate from a rectangular configuration to a shape that is changed back to the original rectangular configuration as the melt-laminate passes from the point at which it is formed, through the die manifold. Profiling has been found to produce a laminate with layers each of uniform thickness, from thermoplastic materials of dissimilar flow properties. However, a drawback with profiling is that experimentation is usually required to determine the precise shape to which it is necessary to intentionally alter the cross-sectional configuration of the layered melt stream. Experimentation is, of course, expensive in terms of both time and money.

From the preceding discussion, it is clear that there is a need for an extrusion apparatus that includes a combining adaptor and a die, that will produce a laminate with layers each of substantially uniform thickness from thermoplastic materials of dissimilar flow properties without profiling of the melt-laminate formed from these thermoplastic materials. Such an improved apparatus would be especially remarkable if it were capable of handling resins of varying viscosities, merely by removal of and replacement of a component thereof with an interchangeable component exactly configured for specific resin viscosities. Moreover, such an improved apparatus would provide an even greater contribution to the art if it lessened the curtaining effect. Such an apparatus would make possible an improved process for the melt-lamination of thermoplastic materials.

SUMMARY OF THE INVENTION

It is accordingly an object of the present invention to provide an extrusion apparatus comprising a combining adaptor and a die, that will produce a laminate having layers each of substantially uniform thickness without profiling of the layered melt stream formed from thermoplastic resins of dissimilar flow properties.

It is a further object of the present invention to provide an extrusion apparatus of this type that is capable of handling resins of varying viscosities, merely by removal of and replacement of a component thereof with an interchangeable component precisely configured for specific resin viscosities.

It is an even further object to provide an extrusion apparatus of this type that reduces the curtaining effect in the layers of the laminate formed.

It is an additional object to provide an improved process for the melt-lamination of thermoplastic materials that does not require profiling.

Additional objects, advantages and novel features of the present invention are set forth in the description that follows, and in part will become apparent to those skilled in the art upon examination of the following description or may be learned by practice of the invention.

To achieve the foregoing objects and in accordance with the purpose of the present invention, as embodied and broadly described herein, there is provided an extrusion apparatus for making a laminate with layers each of substantially uniform thickness, without profiling a melt-laminate formed from thermoplastic streams of dissimilar flow properties. This extrusion apparatus includes a die and a combining adaptor that is inserted into a cavity of the die for receiving the adaptor. The combining adaptor includes a first flow channel, and the extrusion apparatus includes a second flow channel. Between these flow channels, a flow divider is disposed. The flow channels converge at a point of confluence to form a combined flow passage, which includes a manifold. Within the manifold is a locus of divergence, which is situated in the proximity of the point of flow channel confluence. As a result, the apparatus produces a laminate each layer of which has substantially uniform thickness, without profiling of the melt-laminate formed at the point of confluence. Furthermore, the curtaining effect is lessened in the layers of the laminate.

Also provided by the present invention is a process for making the laminate without profiling of the layered melt stream. This process includes the step of forming the layered melt stream in the proximity of a locus at which the stream is caused to diverge. A further result of this process is that the curtaining effect is reduced in the layers of the laminate.

In the drawing and in the detailed description of the invention that follows, I have shown and essentially described only a preferred embodiment of my invention, simply by way of illustration of the best mode contemplated by me of carrying out my invention. As will be realized, my invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention, and which depicts a preferred embodiment of an extrusion apparatus in accordance with the present invention.

FIG. 2 is a view of the extrusion apparatus of FIG. 1, taken along the line 2—2 in FIG. 1, which shows the locus of divergence 48.

DETAILED DESCRIPTION OF THE INVENTION

Figure 1:
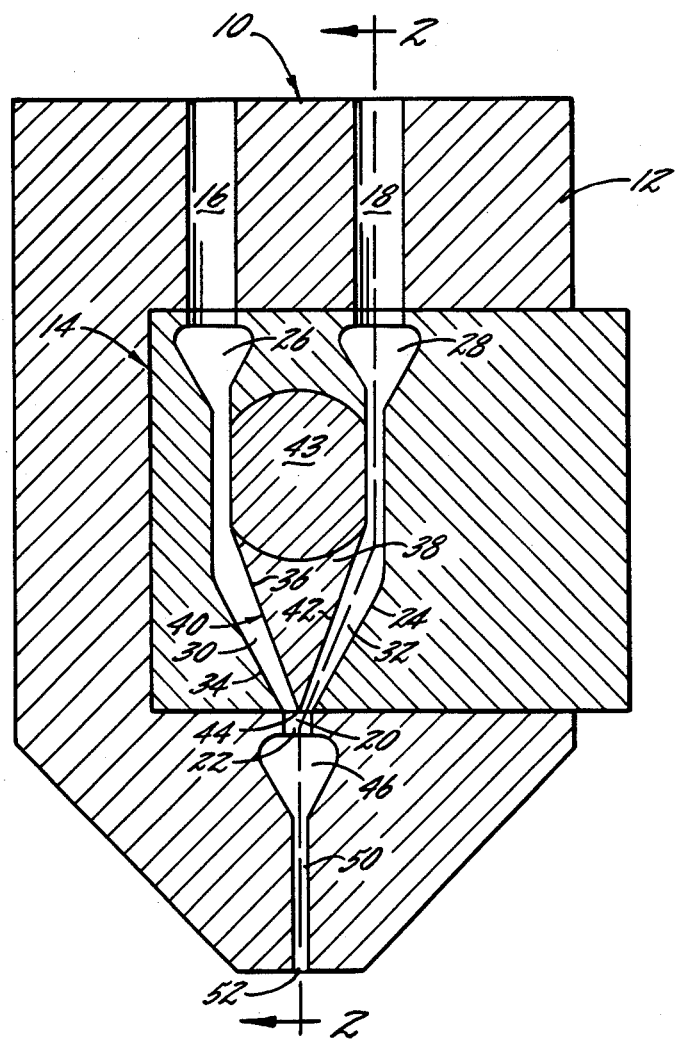
FIG. 1 is a cross-sectional view at mid-center of a preferred extrusion apparatus in accordance with the present invention.

As explained, the present invention is directed to a novel extrusion apparatus and to a unique process for the melt-lamination of thermoplastic materials. More particularly, a longfelt need met by my invention is that it makes it possible to use a combining adaptor and die to form a laminate each layer of which is of substantially uniform thickness, without the necessity of profiling. Specifically, it is intended that this invention be primarily used for forming a laminate from thermoplastic materials of dissimilar flow properties. By the term "dissimilar flow properties" as used in this description of my invention, I mean that the streams of thermoplastic materials converged to form a melt-laminate have flow properties that are so unlike, that one skilled in the extrusion art would profile the melt-laminate formed, in order to produce a laminate having layers each of substantially uniform thickness. Moreover, this invention lessens the curtaining effect, a well known defect.

Referring to FIGS. 1 and 2, a preferred extrusion apparatus 10 in accordance with the present invention is shown. Extrusion apparatus 10 includes a die 12 and a combining adaptor 14. The die has a cavity for receiving the adaptor, in which the adaptor is inserted.

Apparatus 10 provides for the passage of a thermoplastic stream through each of flow channels 16 and 18, and for convergence of these streams at a point of confluence 20 of the flow channels. At the point of confluence, a combined flow passage 22 is formed, and convergence of the molten streams produces a melt-laminate. A section of flow channel 16 and of flow channel 18 passes through combining adaptor 14. Alternatively, for purposes of illustration, the adaptor could cooperate with a longitudinal wall of the die cavity to form a portion of flow channel 16.

Each flow channel preferably includes a manifold or manifold chamber, shown as 26 and 28, in which transverse flow of the molten stream passing therethrough, occurs. As a result, each stream is longitudinally distributed over the entire manifold length. Each flow channel also preferably includes a flow restriction channel, shown as 30 and 32, through which the stream passes from the manifold to point of confluence 20. The restriction channels are tapered, when viewed in cross-section, in the direction of the point of flow channel confluence.

The manifolds are coat-hanger type manifolds, that is, they have a cross-sectional area that diminishes from the center to each end thereof. The manifolds may be of constant or variable cross-section depending upon, for example, individual thermoplastic material requirements. A manifold having a constant cross-section from end to end is a keyhole type manifold.

The size of a manifold in terms of its cross-sectional area is determined by the required thermoplastic material throughput. More specifically, a greater cross-sectional area is required in order for a greater volume of material to pass through, in a given period of time.

Each flow restriction channel has a cross-sectional area that is smaller than the area of any cross-section of the upstream manifold. Flow restriction channel 30 is formed by a longitudinal interior wall 34 of the combining adaptor and a longitudinal wall 36 of a point portion 38 of a divider or vane blade 40. Flow restriction channel 32 is formed by a longitudinal wall 42 of point portion 38 and a longitudinal interior wall 24 of the combining adaptor.

Situated between flow channels 16 and 18 is vane blade 40. Vane blade 40 has a head portion 43 and point portion 38. As the vane blade pivots in a bearing (not shown), point portion 38 moves laterally, thereby defining the cross-sectional areas of the two flow restriction channels. Point portion 38 has a tip end 44.

Between the upstream manifold and the flow restriction channel in each flow channel are a pressure compensating restriction channel and an expansion chamber. These features are not essential to this invention, and are described with particularity in my U.S. Pat. No. 4,533,308, the relevant portions of the disclosure of which are hereby incorporated by reference into this description. Furthermore, as described in that application, vane blade 40 is self-adjusting, but again this is not essential to the present invention.

Combined flow passage 22, which is typically rectangular but may be square, includes a manifold or manifold chamber 46. Referring more particularly to FIG. 2, within the manifold is a locus of divergence 48, where the layered melt stream formed at point of confluence 20 is caused to diverge. This divergence results in transverse flow over the manifold length. An important feature of apparatus 10 is that the point of confluence of flow channels 16 and 18 is in the proximity of the locus of divergence. Hence, point of confluence 20 is as close as possible to manifold 46, say about ½ to 1 inch upstream from the manifold. Alternatively, point of confluence 20 could be within the manifold and just upstream, say about ½ to 1 inch, above locus of divergence 48. This latter location is achieved by tip end 44 of the point portion of the vane blade being extended into manifold 46. The result of this characteristic of my invention is that inclusion of a means for profiling the layered melt stream is not necessary, in order to obtain a laminate each layer of which is of substantially uniform thickness. Moreover, another result of this characteristic is that the curtaining effect is lessened in the layers of the laminate. Accordingly, by the point of confluence of the flow channels being situated in the proximity of the locus of divergence, a synergistic effect results.

Manifold 46 is preferably of the coat-hanger type. However, the manifold could be of constant cross-section. The size of the manifold is determined by the required resin throughput.

After leaving manifold 46, the melt-laminate flows through an exit channel 50. Finally, it exits apparatus 10 at an opening 52.

A further advantage of my preferred extrusion apparatus is that combining adaptor 14 is removable from the die, and may be replaced with an interchangeable adaptor in order to provide apparatus 10 with flow channels having a configuration precisely suited to the viscosities of the resins to be passed through the flow channels. This feature avoids the necessity of otherwise using a completely different extrusion apparatus having flow channels of the needed configuration.

My invention can be employed with an existing die body, or with a new die body produced with a cavity therein for receiving the combining adaptor. An existing conventional single manifold die could be subjected to, for example, electrodischarge machining to form the cavity. A second flow channel could then be drilled in the die that would combine with the flow channel passing through the combining adaptor to form one of the flow passages converging at the point of confluence. Alternatively, the existing flow passage leading to the manifold of the die could be plugged and two flow channels drilled in the die that would combine with the two flow channels passing through the combining adaptor. The apparatus shown in FIGS. 1 and 2 is illustrative of the structure of an extrusion apparatus produced using this alternative method.

An extrusion apparatus in accordance with my invention can be used to form, for example, a three, four, five, seven or nine layer laminate. These multilayer laminates are achievable by the use of a multimanifold die in combination with one or more combining adaptor inserts.

In operation, molten thermoplastic streams enter flow channels 16 and 18, are spread transversely in manifolds 26 and 28, are reduced in cross-sectional area in flow restriction channels 30 and 32, and converge at point of confluence 20, to form a layered melt stream. The melt-laminate flows through combined flow passage 22, and enters manifold 46, in which it is caused to diverge. As a result, transverse flow takes place over the manifold length. The layered melt stream finally exits from die 12 after passing through exit channel 50. The laminate produced has layers each of substantially uniform thickness without profiling of the melt-laminate, and exhibits a lessened curtaining effect.

In my process for making a laminate with layers each of substantially uniform thickness from molten thermoplastics of dissimilar flow properties, an essential step is as follows. A melt-laminate is formed from the molten thermoplastics in the proximity of a locus at which the melt-laminate is caused to diverge. As a result, profiling of the melt-laminate is not essential to produce the laminate, which has layers each of substantially uniform thickness. A further result of this process is that the curtaining effect is reduced in the layers of the laminate.

In the preceding description of the present invention, there is shown and essentially described only a preferred embodiment of my invention, but as mentioned above, it is to be understood that the invention is capable of changes or modifications within the scope of the inventive concept expressed herein. Several changes or modifications have been briefly mentioned for purposes of illustration.

I claim:

1. A process for making a laminated sheet having layers each of substantially uniform thickness and each with a lessened curtaining effect, said process comprising forming a layered melt stream in the proximity of a locus at which said layered melt stream is caused to diverge and thereby undergoes tranverse flow, such that profiling of said layered melt stream is not essential to produce said laminated sheet from molten thermoplastic streams of dissimilar flow properties, and such that the curtaining effect is lessened.

2. The process of claim 1, wherein said laminated sheet has two layers.

3. An extrusion apparatus for making a laminated sheet each layer of which is of substantially uniform thickness, said extrusion apparatus comprising
    (a) a die comprising a manifold chamber, and
    (b) a removable, combining adaptor inserted in a cavity of said die for receiving said combining adaptor,
    wherein said combining adaptor comprises a first flow channel, and said extrusion apparatus comprises a second flow channel; and wherein an adjustable flow divider is disposed between said first flow channel and second flow channel, said first flow channel and said second flow channel converging at a point of confluence to form an exit flow passage; said exit flow passage connecting to said die manifold chamber within which is a locus of divergence; and said locus of divergence being in the proximity of said point of confluence such that profiling of a layered melt stream formed at said point of confluence is not essential to produce said laminated sheet from thermoplastic streams of dissimilar flow properties.

4. The extrusion apparatus of claim 3, wherein said manifold chamber is a coat-hanger type manifold chamber.

5. The extrusion apparatus of claim 3, wherein said combining adaptor comprises said second flow channel.

* * * * *